(12) United States Patent
Hagiwara et al.

(10) Patent No.: US 8,985,265 B2
(45) Date of Patent: Mar. 24, 2015

(54) ELECTRIC POWER STEERING APPARATUS

(71) Applicant: Hitachi Automotive Systems, Ltd., Hitachinaka-shi, Ibaraki (JP)

(72) Inventors: Katsumasa Hagiwara, Isesaki (JP); Haruaki Motoda, Isesaki (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 13/833,613

(22) Filed: Mar. 15, 2013

(65) Prior Publication Data

US 2013/0248277 A1  Sep. 26, 2013

(30) Foreign Application Priority Data

Mar. 21, 2012 (JP) ................................. 2012-064313

(51) Int. Cl.
*B62D 5/04* (2006.01)

(52) U.S. Cl.
CPC ............ *B62D 5/0406* (2013.01); *B62D 5/0409* (2013.01)
USPC ............................ 180/443; 180/444; 180/446

(58) Field of Classification Search
CPC ...... B62D 5/0409; B62D 5/0421; B62D 5/04; B62D 5/0406
USPC .......................................... 180/443, 444, 446
See application file for complete search history.

(56) References Cited

U.S. PATENT DOCUMENTS

| 8,646,568 B2* | 2/2014 | Yamasaki | 180/443 |
| 2006/0108884 A1* | 5/2006 | Shiino et al. | 310/89 |
| 2012/0160596 A1* | 6/2012 | Yamasaki | 180/443 |

FOREIGN PATENT DOCUMENTS

JP  2011-189868 A1  9/2011

* cited by examiner

*Primary Examiner* — Tony H. Winner
*Assistant Examiner* — Marlon Arce
(74) *Attorney, Agent, or Firm* — Foley & Lardner LLP

(57) ABSTRACT

An electric power steering apparatus includes an electric motor, a drive torque transmission mechanism for converting a rotation of the electric motor to a linear movement and transmitting the linear movement to vehicle wheels, first and second circuit boards mounting electronic components to process a motor control command and drive the electric motor based on the motor control command, a metal control housing accommodating therein the first and second circuit boards and coupled at an outer surface thereof to the drive torque transmission mechanism, a heat transfer part located inside the control housing so as to receive heat from the respective circuit boards and a heat guide part extending from the outer surface of the control housing to the inside of the heat transfer member so as to guide the heat transferred to the heat transfer part in a direction toward the drive torque transmission mechanism.

8 Claims, 5 Drawing Sheets

# ELECTRIC POWER STEERING APPARATUS

BACKGROUND OF THE INVENTION

The present invention relates to an improvement in an electric power steering apparatus for an automotive vehicle.

As is well known, an electric power steering apparatus for an automotive vehicle has an electric actuator such as an electric motor to assist driver's steering operation by a rotational driving force of the electric actuator.

Japanese Unexamined Patent Application Publication (Translation of PCT Application) No. 2011-189868 discloses one type of electric actuator for use in such an electric power steering apparatus, in which a motor control circuit board and an inverter power module (circuit board) are stacked and incorporated into a control unit. In this control unit, heat generating electronic components such as CPU for command processing, IC (ASIC) for power supply control, semiconductor switch (FETMOS) for motor control, motor relay (power supply relay) for fail safe control etc. are mounted on the circuit boards. There is thus a tendency that that the thermal load on the control unit increases with the amount of heat generated in the control unit.

SUMMARY OF THE INVENTION

It is conceivable to dispose a heat sink such as radiating fin or a reduction gear box of high thermal mass around the control unit so that heat can be dissipated from the control unit to the heat sink or reduction gear box. In such a case, however, thermal interference may occur between heat transfer passages from the respective heat sources. This results in a deterioration of heat dissipation efficiency.

In view of the foregoing, it is an object of the present invention to provide an electric power steering apparatus with a heat guide part to guide heat quickly from heat sources to any heat radiating means for improvement in heat dissipation efficiency.

According to one aspect of the present invention, there is provided an electric power steering apparatus, comprising: an electric motor rotatable in response to steering operation; a drive torque transmission mechanism for converting a rotation of the electric motor to a linear movement and transmitting the linear movement to vehicle wheels for steering of the vehicle wheels; a first circuit board mounting thereon a processing element to process a control command for rotation control of the electric motor; a second circuit board mounting thereon a driving element to drive the electric motor based on the control command from the first circuit board; a metal control housing accommodating therein the first and second circuit boards and coupled at an outer surface thereof to the drive torque transmission mechanism; a heat transfer part located inside the control housing such that heat is transferred from the respective first and second circuit boards to the heat transfer part; and a heat guide part extending from the outer surface of the control housing to the inside of the heat transfer member so as to guide the heat transferred to the heat transfer part in a direction toward the drive torque transmission mechanism.

In the present invention, the heat guide part is provided to guide heat quickly from the heat sources to the heat radiating means as mentioned above. It is therefore possible to prevent heat interference and obtain in heat dissipation efficiency.

The other objects and features of the present invention will also become understood from the following description.

DESCRIPTIONS OF THE EMBODIMENTS

Figure 1:
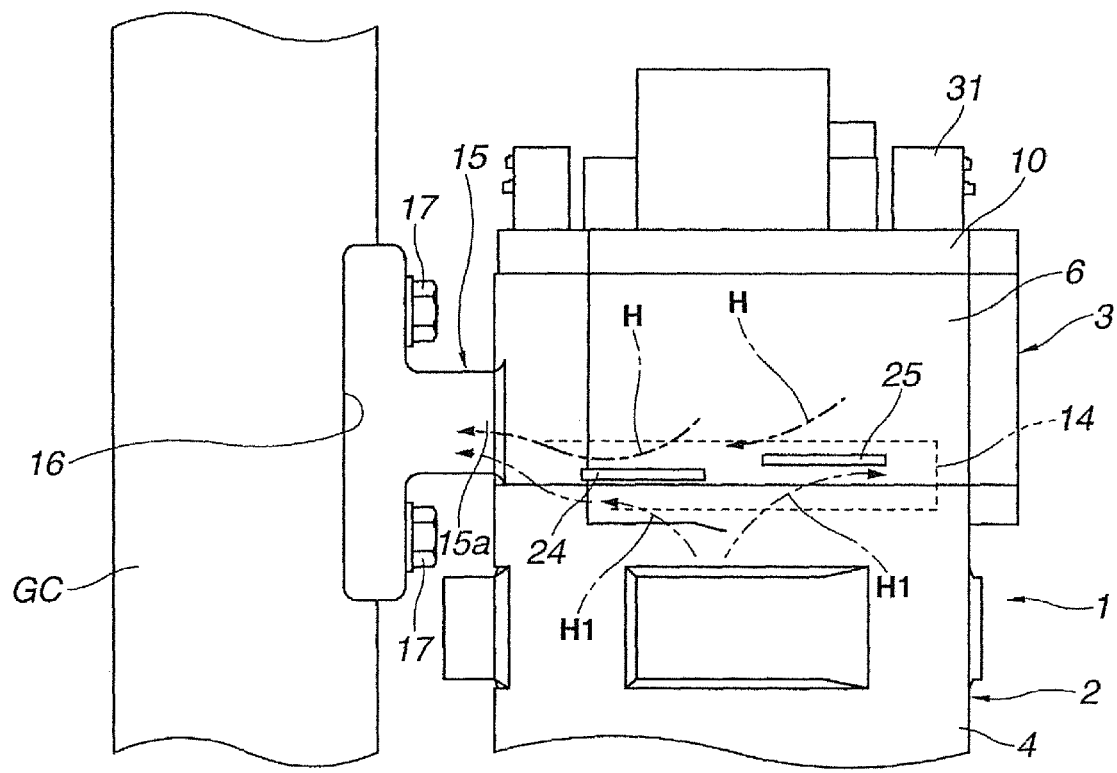
FIG. 1 is a side view of substantial part of an electric actuator of an electric power steering apparatus according to a first embodiment of the present invention.

The present invention will be described in detail below by way of the following first and embodiments. In the following description, the directional terms "top", "bottom" and the like are used for illustration purposes only and are not intended to limit the present invention to any particular direction or orientation. Further, like parts and portions are designated by like reference numerals to thereby omit repeated descriptions thereof.

First Embodiment

Figure 3:
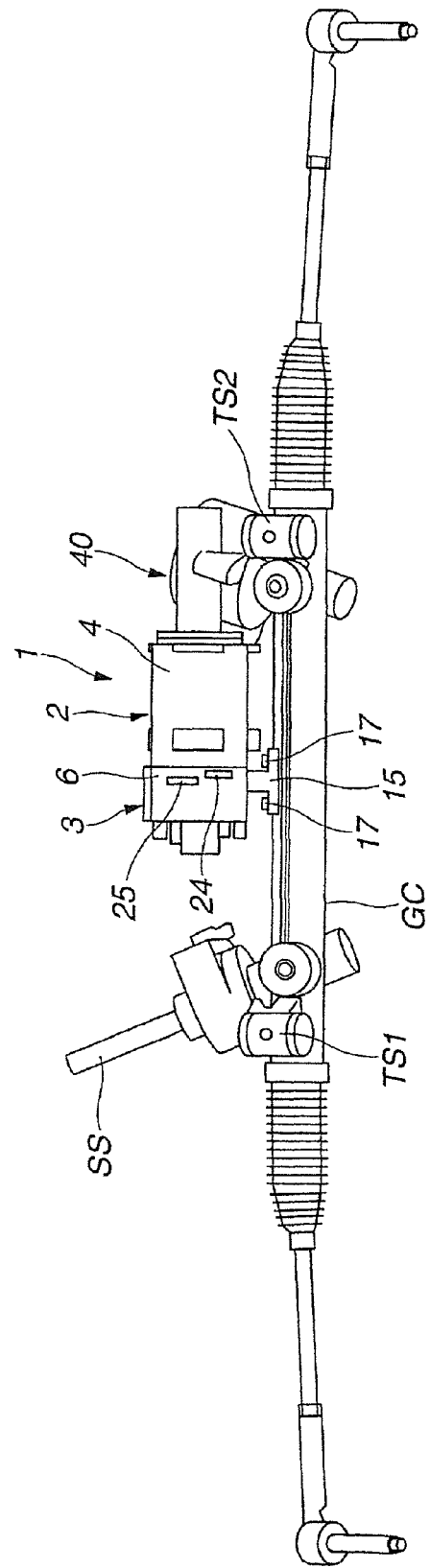
FIG. 3 is a side view of the electric power steering apparatus according to the first embodiment of the present invention.

As shown in FIG. 3, an electric power steering apparatus for an automotive vehicle according to the first embodiment of the present invention is disposed adjacent to a steering shaft SS of the vehicle and is provided with a gear case GC, a rack pinion gear unit, an electric actuator 1, a bracket 15 (as a metal joint part) and first and second torque sensors TS1 and TS2. The gear case GC is made of a metal material such as iron and is fixed to a base end portion of the steering shaft SS. Although not specifically shown in the drawings, the rack pinion gear unit is accommodated in the gear case GC. In the first embodiment, the gear case GC and the rack pinion gear unit constitute a driving torque transmission mechanism. The electric actuator 1 is coupled to a side portion of the gear case GC through the bracket 15 so as to assist rotation of the steering shaft SS. The first torque sensor TS1 is attached to one end portion of the gear case GC (adjacent to the base end of the steering shaft SS) so as to detect a rotational torque of the steering shaft SS, whereas the second torque sensor TS2 is attached to the other end portion of the gear case GC so as to detect a rotational torque of the electric actuator 1.

More specifically, the electric actuator 1 includes a motor unit 2, a control unit (ECU) 3 located on one side of the motor unit 2 and a reduction gear mechanism 40 located on the other side of the motor unit 2.

Figure 2:
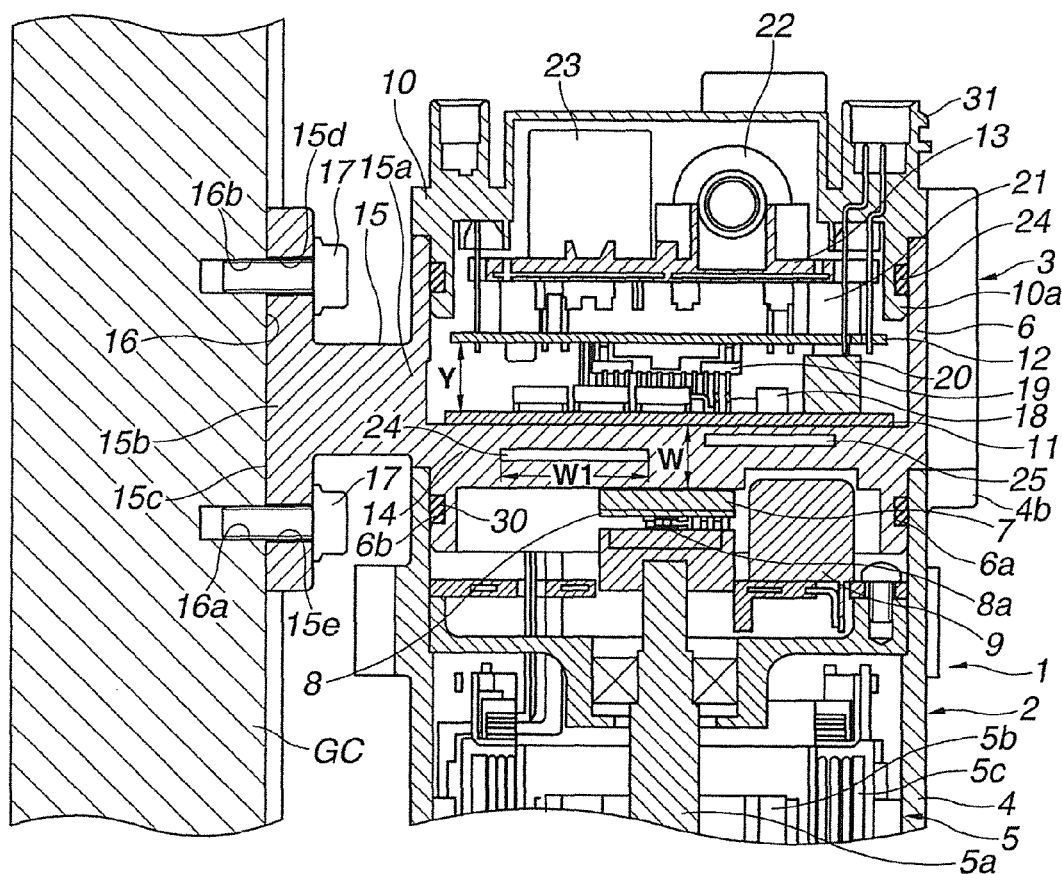
FIG. 2 is a section view of the electric actuator according to the first embodiment of the present invention.

As shown in FIGS. 1 and 2, the motor unit 2 has a motor housing 4 and an electric motor 5 accommodated in the motor housing 4 to apply the rotational torque as a steering assist force. The motor unit 2 also has a sensor mounting plate 7 and a sensor board 8 (as a third circuit board). On the other hand, the control unit 3 has an ECU housing 6 (as a metal control housing) and a plurality of circuit boards, including an inverter board 11 (as a second circuit board), a control circuit board 12 (as a first circuit board) and a resin busbar board 13, stacked and accommodated in the ECU housing 6 to control the rotation of the electric motor 5 as shown in FIGS. 1 and 2.

The motor housing 4 is made of e.g. an aluminum alloy in a bottomed cylindrical shape. Although not shown in the drawings, three boss portions with respective boss insertion holes are integrally formed on a bottom end part of the outer circumference of the motor housing 4 such that the motor housing 4 is coaxially coupled to the reduction gear mechanism 40 by insertion of bolts in these respective bolt insertion holes. Three boss portions 4b with respective bolt insertion holes are also formed at circumferentially evenly spaced positions (120° intervals) on a top end part of the outer circumference of the motor housing 4 such that the motor housing 4 is coaxially coupled to the ECU housing 6 by insertion of bolts in the respective bolt insertion holes of the boss portions 4b.

The electric motor 5 is accommodated in the motor housing 4 and has a motor shaft 5a, a rotor 5b fixed around the motor shaft 5a and a stator 5c (as a first electric circuit) wound around the rotor 5b with a given space left therebetween. Three three-phase terminals are electrically connected to the stator 5c and protrude in parallel from a top open end of the motor housing 4.

The sensor mounting plate 7 is attached to a top end side of the motor shaft 5a.

The sensor board 8 is fixed to the sensor mounting plate 7 by a plurality of screws and has mounting thereon a rotation sensor 8a to detect a rotational speed of the motor shaft 5a. Further, the sensor board 8 is equipped with a motor relay 9 as a heat generating electronic component.

The ECU housing 6 is made of an aluminum alloy in a bottomed cylindrical shape as in the case of the motor housing 4. A lid member 10 is fitted in a top open end of the ECU housing 6 so that the top open end of the ECU housing 6 is closed by the lid member 10.

An annular fitting portion 6a is formed on a bottom end of the ECU housing 6 and fitted by light press fitting in the top open end of the motor housing 4. A fitting groove 6b is cut in the outer circumference of the fitting portion 5a. A seal member 30 is fitted in the fitting groove 6b so as to provide a seal between the top end side of the motor housing 4 and the bottom end side of the ECU housing 6.

Three boss portions with respective bolt insertion holes are formed at circumferential evenly spaced positions (120° intervals) on each of top and bottom end parts of the outer circumference of the ECU housing 6. Similarly, three boss portions with bolt insertion holes are formed on the outer circumference of the lid member 10. The ECU housing 6, the motor housing 4 and the lid member 10 are thus coaxially tightened and fixed together by insertion of the bolts into the bolt insertion holes of the ECU housing 6, the bolt insertion holes of the motor housing 4 and the bolt insertion holes of the lid member 10.

As shown in FIG. 2, the ECU housing 6 has a bottom wall 14 integrally formed inside at the bottom end thereof. Further, the bracket 15 is formed integrally with the outer circumferential surface of the ECU housing 6. In the first embodiment, the ECU housing 6 (including the bottom wall 14) and the bracket 15 are formed simultaneously from the same aluminum alloy by molding.

The bottom wall 14 has a solid, substantially disk shape with a relatively large thickness W and functions as a heat transfer part to receive and absorb heat from the circuit boards 11 to 13 and from the sensor board 8.

The bracket 15 has a substantially T-shaped cross section and includes a cylindrical portion 15a and a fixing portion 15b as shown in FIGS. 1 and 2.

The cylindrical portion 15a is made integral at one end thereof with the outer circumferential surface of the ECU housing 6. A bottom side (about one-thirds) of the cylindrical portion 15a is located on a radial extension line of the bottom wall 14, whereas a top side (about two-thirds) of the cylindrical portion 15a is located at a position falling within a range Y between the inverter board 11 and the control circuit board 12. In other words, the cylindrical portion 15a of the bracket 15 partially corresponds in position to the range of the thickness W of the bottom wall 14 and to the range Y between the circuit boards 11 and 12 in an axial direction of the ECU housing 6 and thus, when viewed in an radial direction of the ECU housing 6 (the axial direction of the cylindrical portion 15a), partially overlaps the range of the thickness W of the bottom wall 14 and the range Y between the circuit boards 11 and 12.

The fixing portion 15b is formed on the other end of the cylindrical portion 15a and is substantially elongated rectangular shaped in a longitudinal direction of the gear case GC. An end face 15c of the fixing portion 15b is curved into an arc along and held in contact with an arc-shaped fixing surface 16 of the gear case GC. Two bolt insertion holes 15d and 15e are formed through both end sides of the fixing portions 15b. As two female thread holes 16a and 16b are formed in the fixing surface 16 of the gear case GC at positions corresponding to these bolt insertion holes 15d and 15e, the fixing portion 15b is fixed to the outer circumference (fixing surface 16) of the gear case GC by insertion of two bolts 17 into the bolt insertion holes 15d and 15e and the female thread holes 16a and 16b.

The inverter board 11 functions as a power conversion circuit board. As shown in FIG. 2, the inverter board 11 has, mounted on one side thereof, a plurality of heat generating electronic components such as a semiconductor switch 18 typified by MOSFET (as a driving element) for rotation control of the electric motor 5 and an electrolytic condenser 10 for removal of noise. A resin-molded terminal holder 20, which incorporates therein female terminal, is attached to an outer circumferential side of the inverter board 11.

The control circuit board 12 performs the function of controlling the semiconductor switch 18 and the like and has, mounted on one side thereof, heat generating electronic components such as a microcomputer (CPU) 21 (as a processing element) to process a drive command signal for rotation control of the electric motor 5 as shown in FIG. 2.

The resin busbar board 13 function as a power supply circuit board. As shown in FIG. 2, the resin busbar board 13 has, mounted on one side thereof, a plurality of heat generating electronic components such as a coil 22, a power supply relay 23 and an aluminum condenser for removal of noise. The power supply relay 23 is herein configured to switch on or off and thereby provide or interrupt a power supply to the electric motor 5 in response to on-off operation of an ignition switch.

The lid member 10 is made of an aluminum alloy in a bottomed cylindrical shape. As shown in FIG. 2, a cylindrical end portion 10a of the lid member 10 is fitted by the bolts in the top end of the ECU housing 6 so as to cover the busbar board 13 (the electronic components such as coil 22 and power supply relay 23 on the busbar board 13) by the lid member 10.

A connector 31 is integrally formed on the top end of the lid member 10 and connected to a battery power source so as to supply power from the battery power source to the electric motor 5 and the circuit boards 11 to 13 through the connector 31.

An annular fitting groove is cut in the outer circumference of the cylindrical end portion 10a. An annular seal member 24 is fitted in the fitting groove so as to provide a seal between the ECU housing 6 and the lid member 10.

As shown in FIGS. 1 and 2, guide slits 24 and 25 are formed as a two-stage heat guide part through the bottom wall 14 of the ECU housing 6 in the radial direction of the ECU housing 6. More specifically, the guide slits 24 and 25 extend, in parallel in the radial direction of the ECU housing 6 (i.e. in the direction perpendicular to the direction of protrusion of the bracket 15), through the bottom wall 14 and outer circumferential wall of the ECU housing 6 so that the respective ends of the guide slits 24 and 25 are open to the outer circumferential surface of the ECU housing 6.

Each of the guide slits 24 and 25 has a substantially rectangular cross-sectional profile with a relatively small thickness but a relatively large width W1. These guide slits 24 and 25 are arranged in a portion of the bottom wall 14 that, when viewed in the radial direction of the ECU housing 6, overlaps the part of the cylindrical portion 15*a* of the bracket 15, but are arranged so as not to overlap each other in the axial direction of the ECU housing 6. The guide slit 24 is located substantially in the center of the bottom wall 14 in a width direction of the bottom wall 14, whereas the guide slit 25 is located at a position closer to the inner top surface of the bottom wall 14, i.e., closer to the inverter board 11 than the guide slit 24. In other words, the guide slits 24 and 25 are offset from each other by the amount of approximately the thickness of one guide slit 24, 25 in the axial direction of the ECU housing 6. Further, the total projection area of the guide slits 24 and 25 (heat guide part) is set about two-thirds the cross-sectional area of the bottom wall 14.

The reduction gear mechanism 40 has a plurality of gear sets placed in a casing 40*a* so as to reduce the rotation of the electric motor 5 and transmit the reduced rotation to the rack pinion gear unit.

The rack pinion gear unit (driving torque transmission mechanism) converts the transmitted rotation to a linear movement and transmits the linear movement to wheels of the vehicle through the gear case GC for vehicle steering.

The above-configured steering apparatus performs normal steering assist operation to operate the electric actuator 1 and drive the electric motor 5 under the control signal from the control unit 3 when the steering shaft SS is rotated by a driver during running of the vehicle.

In the operating state of the electric actuator 1, there is generated heat H of relatively high temperature, i.e., high heat release from the heat generating electronic components of the circuit boards 11 to 13 (the semiconductor switch 18 and electrolytic condenser 19 of the inverter board 11, the CPU 21 of the control circuit board 12 and the coil 22 and power supply relay 23 of the resin busbar board 13 etc.). There is also generated heat H1 of relatively low temperature, i.e., low heat release from the heat generating electronic component of the motor board 8 (the motor relay 9 etc.). These heats H and H1 are transferred to the bottom wall 14 of the ECU housing 6 as indicated by dashed lines in FIGS. 1 and 2.

The flow of the heat H from the circuit boards 11 to 13 into the bottom wall 14 is opposite in direction to the flow of the heat H1 from the motor board 8 into the bottom wall 14. These opposing flows of the heats H, H1 are effectively interrupted by the heat insulating function of the guide slits 24 and 25 and prevented from interfering with each other.

The heats H and H1 interrupted by the guide slits 24 and 25 flow laterally along the guide slits 24 and 25. Most of the heats H and H1 are guided by the guide slits 24 and 25 in a direction toward the bracket 15, and then, transferred from the ECU housing 6 to the bracket 15 and to the gear case GC. As the bracket 15 and the gear case GC have a high thermal mass to function as heat radiating means, these heats H and H1 are dissipated quickly from the bracket 15 and the gear case GC. Some of the heats H and H1 are guided in a direction opposite from the bracket 15 and dissipated from the ECU housing 6 and the motor housing 4.

In this way, it is possible by the guide slits 24 and 25 to prevent interference between the opposing flows of the heat H from the circuit boards 11 to 13 and the heat H1 from the motor board 8 and, at the same time, guide the heats H and H1 in the direction toward the bracket 15 and dissipate the heats H and H1 quickly from the surfaces of the bracket 15 and the gear case GC for improvement in heat dissipation efficiency.

The electric power steering apparatus according to the first embodiment is therefore able to effectively avoid the influence of heat on the circuit boards 11 to 13 and the motor board 8 and reduce the thermal load on the control unit 3 etc. for stable drive control of the electric motor 5 and for durability improvement of the electronic components.

In particular, the low-temperature-side guide slit 24 is offset toward the low temperature side (i.e. the motor side) relative to the high-temperature-side guide slit 25 in the axial direction of the ECU housing. The heat H transferred from the circuit boards 11 to 13 to the bottom wall 14 is thus guided by the high-temperature-side guide slit 25 to the low-temperature-side guide slit 24 while being interrupted by the high-temperature-side guide slit 25, and then, guided by the low-temperature-side guide slit 24 to the bracket 15. This allows quick transfer of the heat H from the circuit boards 11 to 13 to the bracket 15 through the bottom wall 14 for improvement in heat dissipation efficiency.

These offset guide slits 24 and 25 (the outer surfaces of the guide slits 24 and 25) define a stepwise downward heat transfer passage, rather than a horizontal heat transfer passage, for transferring the heat H from the circuit boards 11 to 13 to the bracket 15. This allows increase in heat transferability for improvement in heat dissipation efficiency.

Further, the bracket 15 is arranged between the bottom wall 14 and the gear case GC so as to be partially located on the radial extension line of the bottom wall 14 and to partially fall within the range Y between the circuit boards 11 and 12; and the guide slits 24 and 25 are arranged so as to, when viewed in the radial direction of the ECU housing 6, overlap the part of the cylindrical portion 15*a* of the bracket 15. In such an arrangement, the flow of the heat H from the circuit boards 11 to 13 to the motor side and the flow of the heat H1 from the motor side to the circuit boards 11 to 13 can be effectively interrupted by the guide slits 24 and 25 so as not to interfere with each other. These heats H and H1 can be transferred continuously from the bottom wall 14 to the bracket 15 as the guide slits 24 and 25 are arranged to correspond in position to the part of the cylindrical portion 15*a* of the bracket 15. This also allows improvement in heat dissipation efficiency by quick heat transfer.

The inverter board 11 is held in contact with the inner top surface of the bottom wall 14 so as to secure high heat conductivity from the inverter board 11 to the bottom wall 14.

Furthermore, both of the guide slits 24 and 25 are biased in position toward the electric motor 5 with respect to the center of the dimension of the bracket 15 in the longitudinal direction of the gear case GC. The heat conduction area of the high temperature side of the bottom wall 14 (closer to the circuit boards 11 and 12 on which the electronic components of relatively high heat generation are mounted) can be thus increased so as to secure high heat conductivity from the circuit boards 11 and 12 to the gear case GC.

The heat H1 from the motor board 8 (on which the electronic components such as motor relay 8 of relatively low heat generation are mounted) can be transferred to the motor housing 4 and dissipated from the motor housing 4 to the air. The amount of heat transferred to the gear case GC can be decreased with increase in the amount of heat transferred to the motor housing 4. This makes easier to transfer the heat H from the circuit boards 11 to 13 (on which the electronic components of relatively high heat generation are mounted) to the gear case CG and thereby enables improved heat dissipation from the electronic components.

It is conceivable in the conventional power steering apparatus to dispose a heat sink etc. on the control unit for the purpose of improvement in heat dissipation efficiency. This however causes a problem of upsizing of the power steering apparatus. In the first embodiment, by contrast, there is no need to dispose a heat sink etc. because the guide slits 24 and 25 advantageously performs the heat radiating function. It is thus possible in the first embodiment to avoid upsizing of the power steering apparatus.

Second Embodiment

An electric power steering apparatus for an automotive vehicle according to the second embodiment of the present invention is structurally similar to that according to the first embodiment, except for the structure of the heat guide part.

Figure 4:
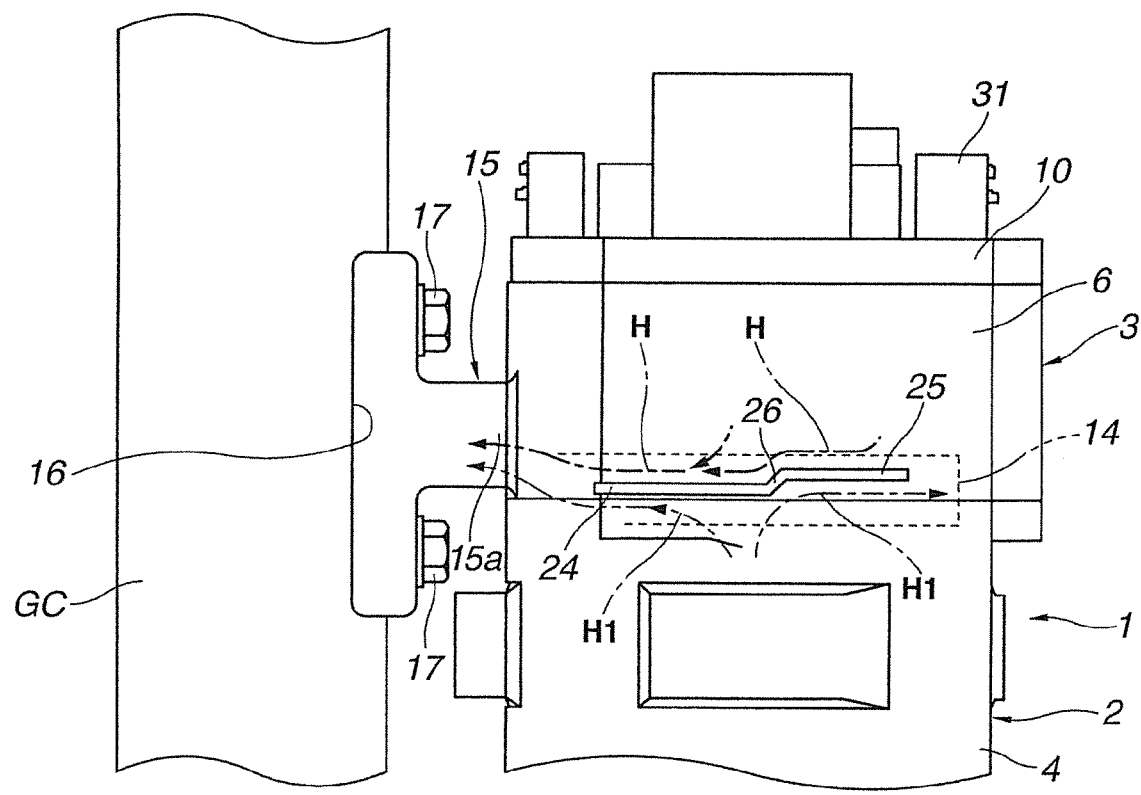
FIG. 4 is a side view of substantial part of an electric actuator of an electric power steering apparatus according to a second embodiment of the present invention.
Figure 5:
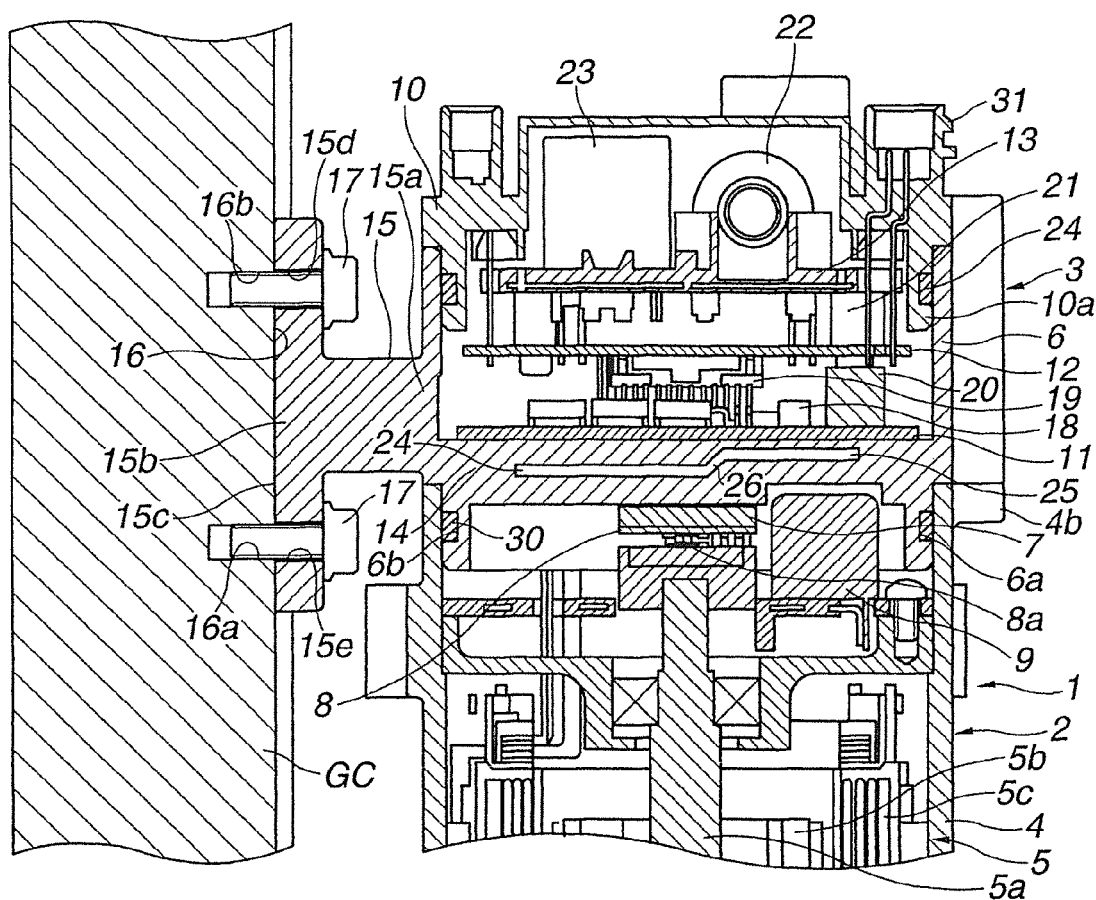
FIG. 5 is a section view of the electric actuator according to the second embodiment of the present invention.

More specifically, the heat guide part includes not only guide slits 24 and 25 but also a link slit 26 extending between the guide slits 24 and 25 as shown in FIGS. 4 and 5. (The guide slits 24 and 25 and the link slit 26 are combined into one slit.) In the second embodiment, the guide slits 24 and 25 are in the same arrangement and dimensions (such thickness and width W1) as those in the first embodiment. The link slit 26 is formed through the bottom wall 14 substantially in parallel with the guide slits 24 and 25 and inclinedly in such a manner that the link slit 26 is connected at one end side thereof to an end side of the guide slit 15 closer to the bracket 15 and at the other end side thereof to an end side of the guide slit 24 farther apart from the bracket 15. The total projection area of the heat guide part (guide slits 24 and 25 and link slit 26) is thus set larger in the second embodiment than in the first embodiment with respect to the cross-sectional area of the bottom wall 14. Further, the link slit 26 is substantially the same in thickness as the guide slits 24 and 25 so that the guide slits 24 and 25 are continuously linked together by the link slit 26.

In the second embodiment, the heat H from the circuit board 11 to 13 is transferred to the bottom wall 14, guided smoothly to the bracket 15 along the top-side outer surfaces of the slits 25, 26 and 24, and then, transferred to the gear case GC through the bracket 15 as indicated by dashed lines in FIG. 4. On the other hand, the heat H1 from the motor board 8 is transferred to the bottom wall 14, guided smoothly to the bracket 15 along the bottom-side outer surfaces of the slits 25, 26 and 24, and then, transferred to the gear case GC through the bracket 15. Namely, the link slit 26 promotes smooth flow of the heat H, H1 from the guide slit 25 to the guide slit 24.

Some of the heats H and H1 transferred from the circuit boards 11 to 13 and the motor board 8 to the bottom wall 14 are dissipated from the outer circumferential surface of the ECU housing 6.

It is accordingly possible by the slits 24 to 26 to more effectively interrupt the opposing flows of the heat H from the circuit boards 11 to 13 and the heat H1 from the motor board 8 and prevent interference between these opposing flows of the heats H and H1. The heat insulating function can be increased as the guide slits 24 and 25 are linked together by the link slit 26. It is also possible by the slits 24 to 26 to transfer the heat H, H1 smoothly to the bracket 15 and the gear case GC so that the heat H, H1 can be dissipated efficiently from these high thermal mass bracket 15 and gear case GC.

The electric power steering apparatus according to the second embodiment is therefore able to more effectively avoid the influence of heat on the circuit boards 11 to 13 and the motor board 8 and reduce the thermal load on the control unit 3 etc. for stable drive control of the electric motor 5 and for durability improvement of the electronic components.

In particular, the heat guide part has the structure that the guide slits 24 and 25 are linked together by the link slit 26 as mentioned above. As the total projection area of the heat guide part (guide slits 24 and 25 and link slit 26) is set larger in the second embodiment than in the first embodiment, the heat guide part can produce a greater heat interrupting effect and prevent heat interference more effectively in the second embodiment.

The other configurations of the second embodiment are the same as those of the first embodiment. It is thus possible in the second embodiment to obtain the same effects as in the first embodiment in addition to the above effects.

Each of the first and second embodiments is advantageous in terms of ease of production without substantial increase in production cost because the slits 24 and 25 or 24 to 26 can be formed in the bottom wall 14 and outer circumferential wall of the ECU housing 6 simultaneously during molding of the ECU housing 6.

The entire contents of Japanese Patent Application No. 2012-64313 (filed on Mar. 21, 2012) are herein incorporated by reference.

Although the present invention has been described with reference to the above-specific embodiment of the invention, the invention is not limited to this exemplary embodiment. Various modification and variation of the embodiment described above will occur to those skilled in the art in light of the above teachings.

For example, the width W1 of the guide slits 24 and 25 may be set to a larger value. The thickness of the guide slits 24 and 25 may also be set as appropriate.

It is feasible to form only one guide slit in the bottom wall 14 although two guide slits 24 and 25 are formed in the bottom wall 14 in the above embodiments. Further, the guide slits 24 and 25 can alternatively be arranged in the same plane without being offset from each other in the width direction of the bottom wall 14.

Although the slits 24 and 25 or 24 to 26 are formed as the heat transfer part in the above embodiment or, the heat guide part is not limited to these guide slits 24 and 25. It is feasible to use any low thermal conductive material such as carbon material as the heat transfer part.

The scope of the invention is defined with reference to the following claims.

What is claimed is:

1. An electric power steering apparatus, comprising:
   an electric motor rotatable in response to steering operation;
   a drive torque transmission mechanism for converting a rotation of the electric motor to a linear movement and transmitting the linear movement to vehicle wheels for steering of the vehicle wheels;
   a first circuit board mounting thereon a processing element to process a control command for rotation control of the electric motor;
   a second circuit board mounting thereon a driving element to drive the electric motor based on the control command from the first circuit board;
   a metal control housing accommodating therein the first and second circuit boards and coupled at an outer surface thereof to the drive torque transmission mechanism;

a heat transfer part located inside the metal control housing such that heat is transferred from the respective first and second circuit boards to the heat transfer part; and a heat guide part extending through the outer surface of the metal control housing to the inside of the heat transfer part so as to guide the heat transferred to the heat transfer part in a direction toward the drive torque transmission mechanism.

2. The electric power steering apparatus according to claim 1, further comprising: a third circuit board equipped with motor relay to provide or interrupt a power supply to the electric motor, wherein the heat transfer part is arranged between the second and third circuit boards.

3. The electric power steering apparatus according to claim 1, wherein the heat transfer part is a bottom wall of the metal control housing; and wherein the heat guide part is a slit formed extending through the bottom wall and outer circumferential wall of the metal control housing in a radial direction of the control housing.

4. The electric power steering apparatus according to claim 3, wherein two or more slits are formed as the heat guide part and offset from each other so as to define a stepwise heat transfer passage from the first and second circuit boards.

5. The electric power steering apparatus according to claim 1, further comprising a metal joint part connecting the outer circumferential wall of the control housing to the drive torque transmission mechanism, wherein the metal joint part is arranged so as to be partially located on an extension of the heat transfer part in a radial direction of the control housing and to partially fall within a range between the first and second circuit boards; and wherein the heat guide part is arranged in a portion of the heat transfer part that, when viewed in a radial direction of the metal control housing, overlaps the metal joint part.

6. The electric power steering apparatus according to claim 5, wherein the heat guide part is biased in position toward the electric motor with respect to the center of a dimension of the metal joint part in a longitudinal direction of the drive torque transmission mechanism.

7. An electric power steering apparatus, comprising:

an electric motor rotatable in response to steering operation;

a drive torque transmission mechanism for converting a rotation of the electric motor to a linear movement and transmitting the linear movement to vehicle wheels for steering of the vehicle wheels;

a first circuit board mounting thereon a processing element to process a control command for rotation control of the electric motor;

a second circuit board mounting thereon a driving element to drive the electric motor based on the control command from the first circuit board;

a metal control housing accommodating therein the first and second circuit boards and coupled at an outer surface thereof to the drive torque transmission mechanism;

a heat transfer part provided as a separator wall between the electric motor and the at least one of the first and second circuit boards, the separator wall having an insulator gap between opposing first and second sides thereof, such that heat is transferred from the at least one of the first and second circuit boards to the first side of the heat transfer part, and heat is transferred from the electric motor to the second side of the heat transfer part; and a heat guide part extending from the heat transfer part through to the outer surface of the metal control housing coupled to the drive torque transmission mechanism, so as to guide the heat transferred to the heat transfer part in a direction toward the drive torque transmission mechanism.

8. An electric power steering apparatus, comprising:

an electric motor rotatable in response to steering operation;

a drive torque transmission mechanism for converting a rotation of the electric motor to a linear movement and transmitting the linear movement to vehicle wheels for steering of the vehicle wheels;

at least one circuit board mounting thereon a processing element to process a control command for rotation control of, and a driving element to drive, the electric motor;

a metal control housing accommodating therein the at least one circuit board, and coupled at an outer surface thereof to the drive torque transmission mechanism;

a heat transfer part provided as a separator wall between the electric motor and the at least one circuit board, the separator wall having an insulator gap between opposing first and second sides thereof, such that heat is transferred from the at least one circuit board to the first side of the heat transfer part, and heat is transferred from the electric motor to the second side of the heat transfer part; and a heat guide part extending from the heat transfer part through to the outer surface of the metal control housing coupled to the drive torque transmission mechanism, so as to guide the heat transferred to the heat transfer part in a direction toward the drive torque transmission mechanism.

\* \* \* \* \*